(12) United States Patent
Chien et al.

(10) Patent No.: US 6,187,165 B1
(45) Date of Patent: Feb. 13, 2001

(54) ARRAYS OF SEMI-METALLIC BISMUTH NANOWIRES AND FABRICATION TECHNIQUES THEREFOR

(75) Inventors: Chia-Ling Chien; Peter C. Searson; Kai Liu, all of Baltimore, MD (US)

(73) Assignee: The John Hopkins University, Baltimore, MD (US)

(*) Notice: Under 35 U.S.C. 154(b), the term of this patent shall be extended for 0 days.

(21) Appl. No.: 09/164,376

(22) Filed: Oct. 1, 1998

Related U.S. Application Data

(60) Provisional application No. 60/060,658, filed on Oct. 2, 1997.

(51) Int. Cl.[7] ................................. C25D 5/02; G11B 5/66

(52) U.S. Cl. ........................... 205/118; 205/121; 205/123; 205/124; 205/131; 428/694 T; 428/900

(58) Field of Search .............................. 428/694 T, 900; 205/118, 121, 123, 124, 131

(56) References Cited

U.S. PATENT DOCUMENTS

| | | | |
|---|---|---|---|
| 5,747,180 | * | 5/1998 | Miller .................................. 428/601 |
| 5,989,406 | * | 11/1999 | Beetz .................................. 705/118 |

OTHER PUBLICATIONS

M.N. Baibich et al., "Giant Magnetoresistance of (001) Fe/(001) Cr Magnetic Superlattices", Physical Review Letters, Nov. 21, 1988, pp. 2472–2475.

S.S.P. Parkin et al., "Oscillatory Magnetic Exchange Coupling Through Thin Copper Layers", Physical Review Letters, Apr. 22, 1991, pp. 2152–2155.

B. Dieny et al., "Magnetotransport Properties of Magnetically Soft Spin–Valve Structures (invited)", Journal of Applied Physics, Apr. 15, 1991, pp. 4774–4779.

John Q. Xiao et al., "Giant Magnetoresistance in Nonmultilayer Magnetic Systems", Physical Review Letters, Jun. 22, 1992, pp. 3749–3752.

Eric E. Fullerton et al., 150% Magnetoresistance in Sputtered Fe/Cr(100) Superlattices, Applied Physics Letters, Sep. 20, 1993, pp. 1699–1701.

T.M. Whitney et al., "Fabrication and Magnetic Properties of Arrays of Metallic Nanowires", Science, Sep. 3, 1993, pp. 1316–1319.

K. Liu et al., "Perpendicular Giant Magnetoresistance of Multilayered Co/Cu Nanowires", Physical Review B, Mar. 15, 1995, pp. 7381–7384.

N. Garcia et al., "Galvanomagentic Studies of Bismuth Films in the Quantum–Size–Effect Region", Physical Review B, Mar. 15, 1972, pp. 2029–2039.

Yu. F. Ogrin et al., "Observation of Quantum Size Effects in Thin Bismuth Films", JETP Letter, Feb. 1, 1966, pp. 71–73.

Yu. F. Komnik et al., "Feature of Temperature Dependence of the Resistance of Thin Bismuth Films", Soviet Physics JETP, Jun. 10, 1970, pp. 364–373.

Mei Lu et al., "Low–Temperature Electrical–Transport Properties of Single–Crystal Bismuth Films Under Pressure", Physical Review B, Jan. 15, 1996, pp. 1609–1615.

(List continued on next page.)

Primary Examiner—Leszek Kiliman
(74) Attorney, Agent, or Firm—Dickstein Shapiro Morin & Oshinsky LLP

(57) ABSTRACT

Novel arrays of nanowires made of semi-metallic Bismuth (Bi) is disclosed made by unique electrodeposition techniques. Because of the unusual electronic properties of the semi-metallic Bi and the nanowire geometry, strong finite size effects in transport properties are achieved. In addition, very large positive magnetoresistance, 300% at low temperatures and 70% at room temperature, with quasilinear field dependence have been attained.

9 Claims, 4 Drawing Sheets

OTHER PUBLICATIONS

Michael Gurvithch, "Resistivity Anomaly in Thin Bi Wires: Possibility of a One–Dimensional Quantum Size Effect", Journal of Low Temperature Physics, 1980, pp. 777–791.

J.H. Mangez et al., "Transport Properties of Bismuth in Quantizing Magnetic Fields", Physical Review B, Jun. 3, 1976, pp. 4381–4385.

D.L. Partin et al., "Growth and Characterization of Epitaxial Bismuth Films", Physical Review B, Aug. 15, 1988, pp. 3818–3824.

C.M. Lerner et al., "Magnetoresistivity of Bismuth Films in Magnetic Fields to 19 Tesla", Applied Physics, Dec. 21, 1990, pp. 433–437.

* cited by examiner

ARRAYS OF SEMI-METALLIC BISMUTH NANOWIRES AND FABRICATION TECHNIQUES THEREFOR

This patent application is derived and claims priority from Provisional Application No. 60/060,658, filed on Oct. 2, 1997.

Government Interest: This invention was made with government support under Grant No. NSF MRSEC DMR 9632526 awarded by the National Science Foundation. The government has certain rights in the invention.

BACKGROUND OF THE INVENTION

Magnetic nanostructures, such as multilayers (e.g., Co/Cu) and granular solids (e.g., Co—Ag) with metallic constituents, have attracted a great deal of attention due to the realization of new phenomena such as giant magnetoresistance (GMR) and interlayer coupling. These structures are of technological interest for applications in field-sensing devices. For the case of GMR, the effect size is generally on the order of a few to a few tens of percent, except in nearly perfect superlattices which show the largest GMR effect of about 150% at 4.2 K.

Recently, advances in materials processing techniques have resulted in the fabrication of other novel nanostructures, such as arrays of nanowires. Metallic nanowires, as well as multilayered nanowires, have been successfully fabricated by electrodeposition. The nanowires are grown by electrochemical deposition into nanometer-sized cylindrical pores in a suitable insulating medium, such as polycarbonate, or mica. The nanowires are typically up to 10 micrometers in length, arranged in a parallel manner. The diameter of the wire can be controlled from tens of nanometers to microns, and the number density can be varied from $10^4$ wires/mm$^2$ to $10^7$ wires/mm$^2$. Arrays of nanowires are a new type of nanostructure with quasi-one dimensional characteristics and they provide new means to study the intricate physics as well as the practical applications in nanostructured materials.

To date, the constituent materials in the overwhelming majority of magnetic nanostructures include transition metals, alloys, and noble metal elements. Bismuth (Bi) has been used to study both classical and quantum finite size effects, for which the characteristic lengths are the carrier mean free path and Fermi wavelength, respectively. The pursuit of quantum size effects since the 1960's, initiated by the observation of resistivity oscillations in Bi thin films as the thickness is varied, has continued to attract attention. Most of these studies involve Bi thin films, for which film thickness is a convenient variable. However, fabrication of high quality Bi thin films through traditional vapor deposition has proven to be technically challenging. The properties of Bi thin films fabricated by vapor deposition depend sensitively on the purity and the concentration of crystal defects, which are further compounded by the low melting point of Bi.

SUMMARY OF THE INVENTION

In the present invention, nanowires are fabricated by electrodeposition using semi-metallic bismuth. In this novel form of nanowire, positive magnetoresistance (MR) as high as 300% at low temperatures and 70% at room temperature, with a quasi-linear field dependence has been achieved. The MR effect in these semi-metallic nanostructures not only has much larger magnitude than, but also is characteristically different from, the negative GMR previously obtained in metallic nanostructures.

This invention takes advantage of the electronic properties of semi-metallic Bi which are fundamentally different from those of common metals.

The invention solves all the limitations noted of the known structures with the novel construction and use of semi-metallic bismuth. The MR effect exhibited by the semi-metallic Bi nanowires is much larger in magnitude than that of all GMR materials previously reported for magnetic nanostructures. Equally important for device applications is the quasi-linear field dependence of MR at all temperatures. Magnetoresistive devices based on metallic nanostructures must meet stringent requirements in layer thickness on the nanometer scale and sufficiently high resistance of the sensing element. The high resistivity of the Bi nanowires and the variable wire density can readily accommodate a very wide resistance range without sacrificing sensitivity.

DETAILED DESCRIPTION OF PREFERRED EMBODIMENTS

The invention will be described in detail with reference to the preferred embodiments illustrated in FIGS. 1a, 1b, 2, 3 and 4. The invention is described herein in its preferred application to semi-metallic bismuth used to form nanowire structures. However, the invention may be applicable to any type or configuration of structure that encounters the same or similar problems overcome by the invention described herein.

In accordance with one aspect of the invention, an insulating membrane, preferably a polycarbonate membrane (Nuclepore) is used as a template for formation of the Bi nanowires. In addition to polycarbonate, other materials that may serve as such an insulating membrane include pourous mica, alumite (aluminum oxide), or glass. A layer of gold (Au) sputtered onto the bottom side of the membrane may serve as the working electrode in a standard three-electrode electrochemical cell. While gold was used as the electrode material in this particular embodiment, it should be noted that gold may be replaced with platinum, or any other metal or metal alloy that is chemically stable in the solution. The electrolyte solution used contains 75 g/l bismuth nitrate pentahydrate, 65 g/l potassium hydroxide, 125 g/l glycerol, and 50 g/l tartaric acid. The deposition solution is buffered to preferably pH=0.90 with nitric acid. The deposition process is carried out at −30 mV relative to the Ag+/AgCl reference electrode, with Pt serving as the counter electrode. Using this process, nanowires with diameter of 10 $\mu$m, 2 $\mu$m, 1 $\mu$m, 400 nm, 200 nm, 100 nm and 15 nm can be fabricated with corresponding wire densities of $1\times10^3$, $2\times10^4$, $2\times10^5$, $1\times10^6$, $3\times10^6$, $6\times10^6$ and $6\times10^6$ wires/mm$^2$, respectively.

Figure 1A:
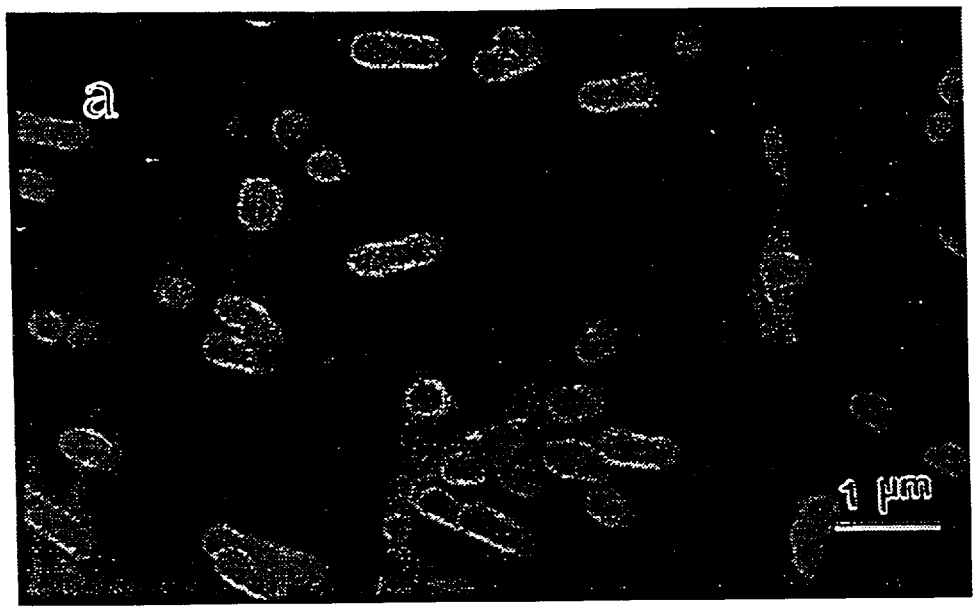
FIG. 1a shows a top-view SEM image of 400 nm wires each with polycarbonate membranes partially removed.
Figure 1B:
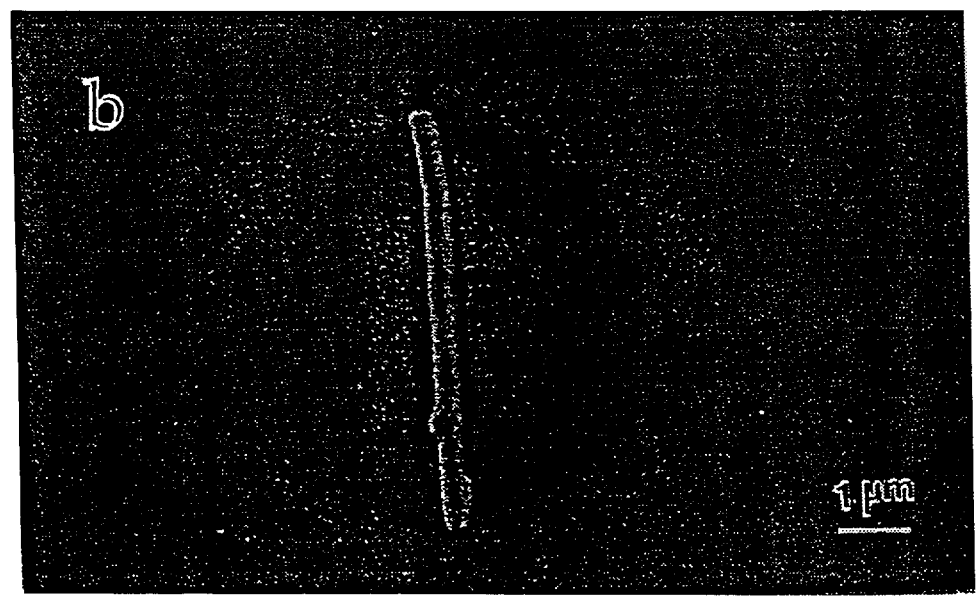
FIG. 1b shows a side-view of a single free standing 400 nm nanowire removed from the polycarbonate membrane.

X-ray diffraction of the Bi nanowires so constructed has revealed a polycrystalline rhombohedral structure, the same as that of bulk Bi, with no preferred orientation. Scanning electron microscopy (SEM) has been used to examine the Bi nanowires. FIG. 1a shows the top-view SEM image of the 400 nm nanowires with their polycarbonate membranes partially removed. The wires are essentially parallel with a cylindrical shape formed by the nanopores of the membrane. A side-view of a single free standing 400 nm nanowire removed from the polycarbonate membrane is shown in FIG. 1b. The nanowires have also been confirmed to be pure Bi by energy dispersive x-ray microanalysis.

After deposition of the nanowires, the top side of the membrane is coated with another layer of Au. Both Au layers are then patterned in order to make electrical contact to a smaller number of Bi nanowires. This method allows the estimate of the resistance of a single wire from a group of wires connected in parallel. Assuming all the wires in the selected area contribute equally to the total resistance, then the Bi nanowire resistance is unconventionally large. For the case of 400 nm nanowires, the resistance per wire is over 1000 ohms in the temperature range of 5 K to 300 K. Even if only a small fraction of the nanowires are in contact, the single wire resistance is still much larger than the 90 ohms expected using the bulk Bi resistivity of 115 $\mu$-ohms-cm at room temperature. The resistivity of an electrodeposited 1 $\mu$m thick polycrystalline Bi film, using the same electrodeposition method, is about 200 $\mu$-ohms-cm at 300 K.

The large enhancement of Bi resistivity in nanowires is the direct result of the nanowire geometry. Previously, similarly large resistivity enhancement has been reported in multilayered Co/Cu nanowires. Since the mean free paths of Co and Cu are much smaller than the wire dimensions, the additional resistance is due mainly to scattering at the numerous Co/Cu interfaces and, to a lesser extent, boundary scattering at the wire surface. In the present case of Bi wires, scattering at the wire surface and grain boundaries is expected to be significant since the wire dimensions are much less than the bulk Bi mean free path, especially the mm-scale at low temperature. Therefore, the large enhancement of resistivity in Bi nanowires can be ascribed to strong classical finite-size effects as the mean free path is effectively limited by the wire diameter.

Figure 2:
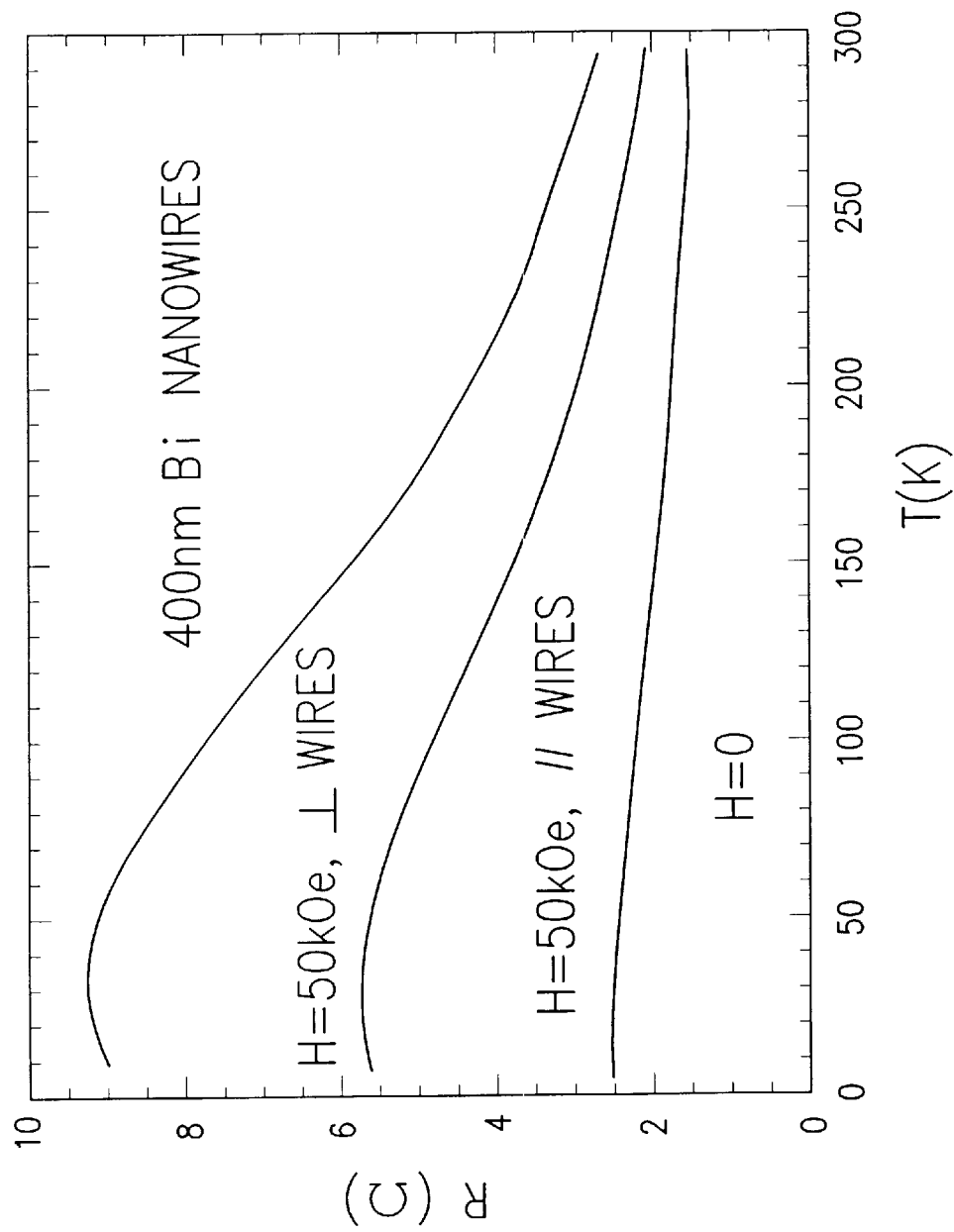
FIG. 2 is a chart showing the temperature dependence of the resistance of Bi nanowires made in accordance with the invention in zero and 50 kOe magnetic field.

The temperature and field dependence of the transport properties for semi-metallic Bi nanowires (400 nm in diameter) is shown in FIG. 2. In zero magnetic field, the resistance increases with decreasing temperature, i.e., the temperature coefficient of resistance (TCR) is negative. The ratio of resistance at 5 K and 293 K, R(5 K)/R(293 K), is about 1.5. All the Bi nanowire samples show negative TCR with R(5 K)/R(293 K) in the range of 1.3 to 1.7. However, the increase of the resistance is not exponential, which is characteristic for semiconductors and insulators.

In bulk Bi, the TCR is positive, while negative TCR is usually observed in Bi thin films. This is because the main contributions to the TCR in Bi are due to carrier concentration and mobility, which have opposite temperature dependence. With increasing temperatures, the carrier concentration increases, whereas the carrier mobility decreases, leading to respectively negative and positive TCR. The competition between these two opposing contributions ultimately determines the TCR of a Bi sample. In bulk Bi, the carrier mobility dominates, thus a metallic-like positive TCR is seen. In Bi thin films, however, the carrier mobility is suppressed by structural imperfections and likely finite-size effects, leading to a negative TCR due to the carrier concentration. It is known that the temperature at which the negative TCR sets in has been used as an indication of the film quality. In high quality epitaxial Bi films, positive TCR can be observed in 500 nm thick films, while the negative TCR begins to set in at smaller thicknesses. In the present case of Bi nanowires, because of the polycrystalline nature of the material, and the smaller wire diameter in comparison with the mean free path, the TCR is generally negative, and also rather small.

Figure 3:
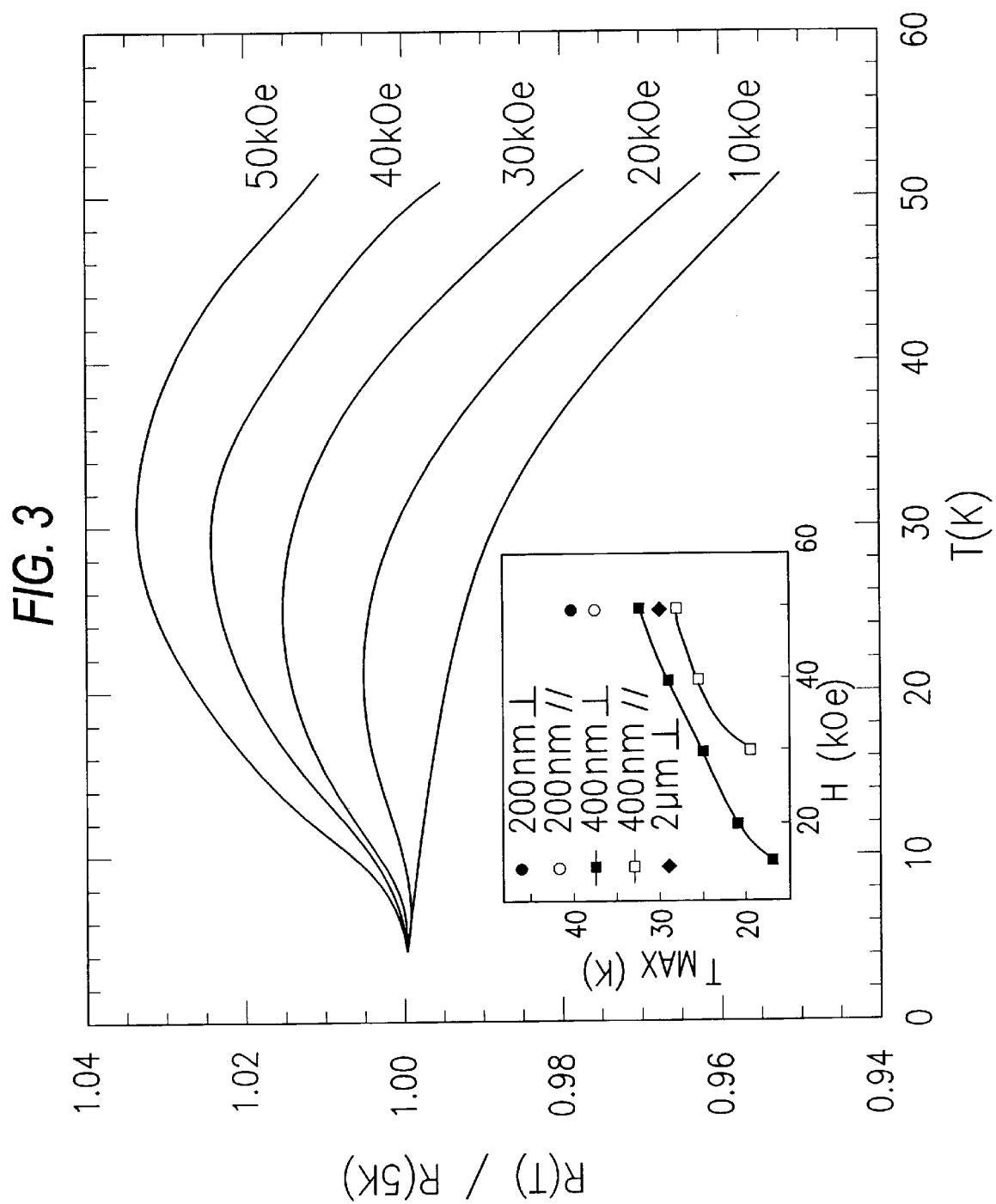
FIG. 3 is a chart showing the development of a resistance maximum of Bi nanowires of the invention in various transverse magnetic fields.

Upon the application of a magnetic field H, the resistance of the Bi wires increases for both fields parallel (longitudinal) and perpendicular (transverse) to the wires, as shown in FIG. 2 for H=50 kOe. Furthermore, the temperature dependence of the resistance shows a maximum at $T_{max}$, at about 40 K. The resistance maximum observed in semi-metallic Bi wires under a magnetic field resembles the resistance maximum in zero magnetic field in very thin Bi films (<60 nm). In previous studies, the value of $T_{max}$ is found to shift to higher temperatures as the film thickness is reduced. In the semi-metallic Bi nanowires, such a maximum does not occur until a sufficiently large magnetic field is applied. FIG. 3 shows the development of such a resistance maximum in a transverse magnetic field for the 400 nm wires. To illustrate this effect more clearly, the resistance has been normalized to the value at 5 K. The maximum is not appreciable until the applied field is above 20 kOe, beyond which $T_{max}$ is shifted to higher temperatures. The value of $T_{max}$ also depends on the applied field geometry and the wire diameter, as shown in the inset of FIG. 3. The transverse field always produces a resistance maximum at a higher temperature than that for the longitudinal case. When the same magnetic field is applied in the same geometry, the value of $T_{max}$ increases with decreasing wire diameter. In very thin Bi films, the appearance of $T_{max}$ is attributed to the rapid increase of mobility at low temperatures, a mechanism originated from the quantum size effect. It is found that at low temperatures, the phonon energy is insufficient to transfer electrons between the size-quantized sub-bands. The suppression of electron-phonon scattering effectively increased the mobility.

In the present semi-metallic Bi nanowires, such size quantization may have come into play as the wire diameter is comparable to the Fermi wavelength, resulting in the dependence of $T_{max}$ on wire diameters. Application of a strong magnetic field is likely to introduce magnetic quantization. The phonon scattering processes are impeded in the similar fashion by magnetic quantization at low temperatures, especially in strong magnetic fields where the energy difference in adjacent magnetically quantized sub-bands becomes larger. The resultant increase of mobility at low temperatures gives rise to the resistance maximum.

As already shown in FIG. 2, very large positive MR has been realized in semi-metallic Bi nanowires. It is further noted that the transverse MR in Bi nanowire is always larger than the longitudinal MR. The positive MR in Bi nanowires should be contrasted with those of the well-known negative GMR due to the spin-dependent scattering as observed in magnetic multilayers and granular solids. There, not only the GMR is negative, i.e., the resistance decreases with field strength, but also the transverse and longitudinal GMR are the same, apart from demagnetized field corrections. The field dependence is generally hysteretic and the MR saturates at high fields when the magnetic entities are aligned by the magnetic field. The mechanisms for the positive MR in Bi nanowires are clearly different from those for the negative GMR in magnetic nanostructures.

Figure 4A:
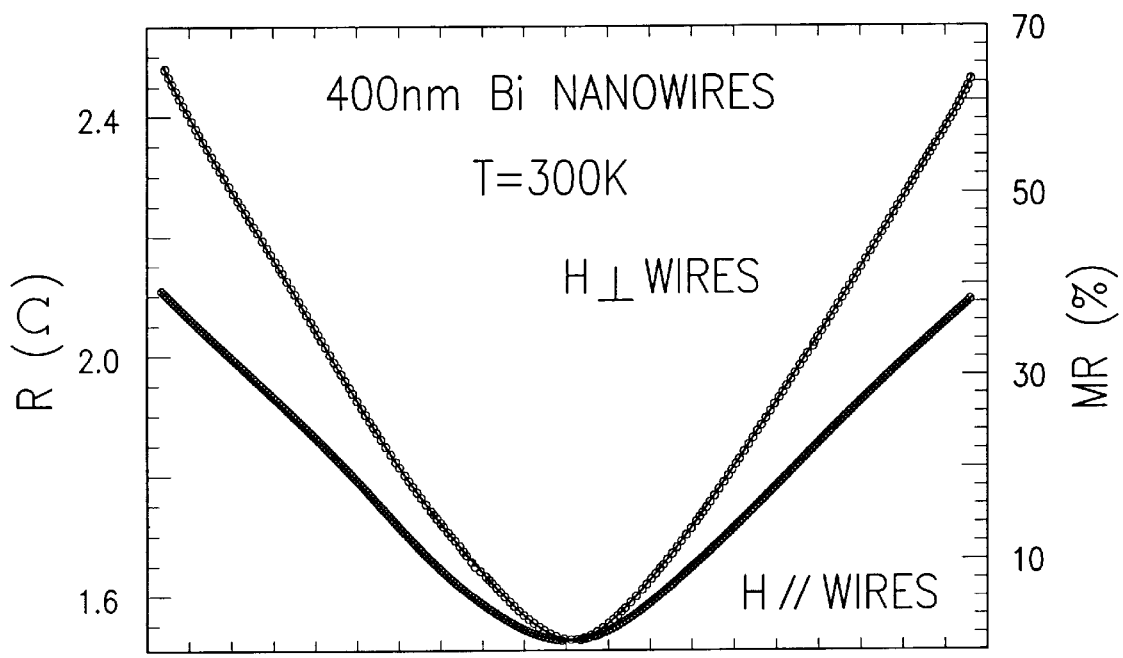
FIG. 4 is a chart showing at a given temperature, the field dependence of the positive magnetoresistance of a Bi nanowire made in accordance with the invention.
Figure 4B:
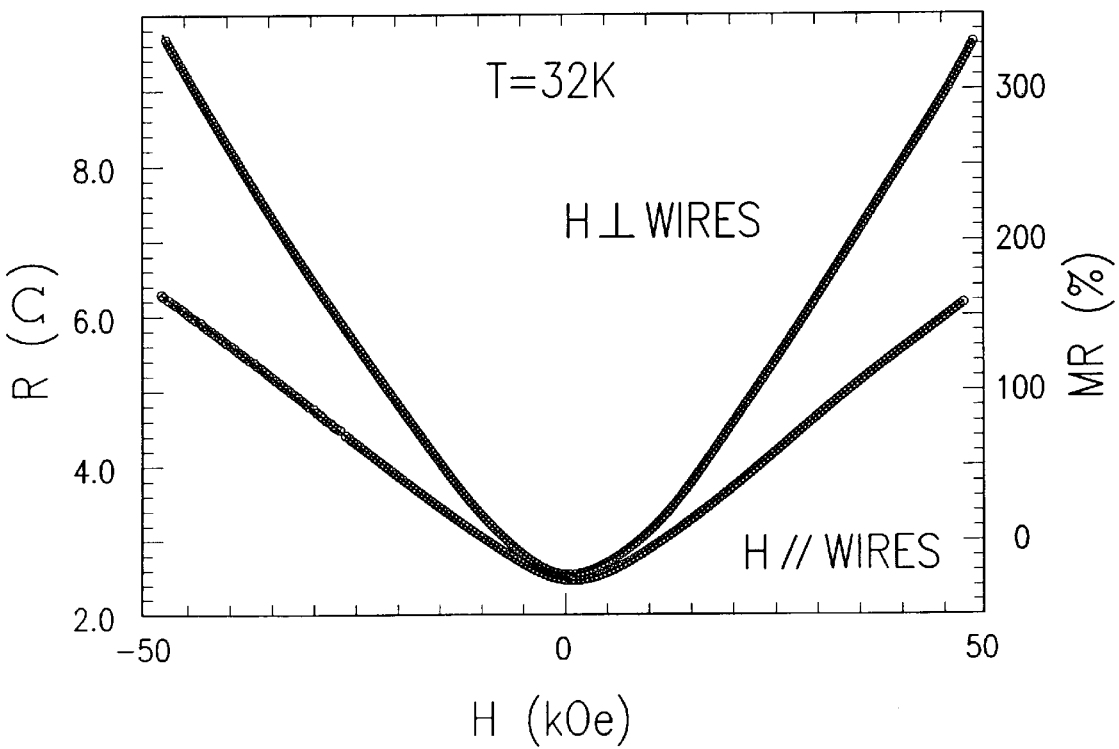

We next note the size of the MR effect in the semi-metallic Bi nanowires, defined as [R(H)—R(O)]/R(O), and its field dependence. For the 400 nm Bi nanowires at 300 K shown in FIG. 4a, a positive transverse MR of about 70% and a longitudinal MR of 40% is realized in a magnetic field up to 50 kOe. Furthermore, the magnetic field dependence of MR, quadratic at low fields, becomes linear at higher fields, and shows no sign of saturation. At lower temperatures, the field dependence of MR remains qualitatively the same, but the size of the MR effect becomes even larger. As shown in FIG. 2, because the resistance R(O) at H=O is weakly temperature dependent, the temperature dependence of the MR effect size is essentially that of the resistance in the field R(H). In the case of 400 nm wires at 32 K, MR of 300% has been attained, and its field dependence is shown in FIG. 4b. The MR effect exhibited by the semi-metallic Bi nanowires is much larger in magnitude than that of all GMR materials previously reported for magnetic nanostructures. Equally important for device applications is the quasi-linear field dependence of MR at all temperatures. Magnetoresistive devices based on metallic nanostructures must meet stringent requirements in layer thickness on the nanometer scale and sufficiently high resistance of the sensing element. The high resistivity of the semi-metallic Bi nanowires in accordance with the invention and the variable wire density can readily accommodate a very wide resistance range without sacrificing sensitivity. Finally, because of the nanowire geometry, field sensing is administered locally near the tip of the nanowire. As a result, Bi nanowire arrays can be used with a controlled wire density as massive parallel-sensing systems in high density perpendicular recording media.

The positive MR of semi-metallic Bi used in a nanowire geometry of the present invention is the result of unusual characteristics of the carriers under the ordinary MR effect, which is the curving of the electron trajectory by a magnetic field. The characteristic quantity is $\omega_c\tau$, inversely proportional to the carrier density, where $\omega_c$ is the cyclotron frequency, $\tau$ is the relaxation time. The ordinary MR exhibited in metals is usually very small, less than a few percent, owing to very small values of $\omega_c\tau$. However, in the present invention, due to the very low carrier concentration, several orders of magnitude smaller than those in typical metals, the characteristic term $\omega_c\tau$ is much larger, leading to a large positive magnetoresistance. In pure bulk Bi single crystals, large values of MR have been observed at 4.2 K. However, in thin films, other than the MBE-grown epitaxial Bi single crystals, the magnitude of the MR effect is generally much less. Accordingly, for these reasons and as shown above, very large MR effect can be realized in arrays of semi-metallic Bi nanowires, fabricated by cost-effective electrodeposition.

The quantity of importance, $\omega_c\tau$, can also be written as $\mu H/c$, which in turn is proportional to lH, where $\mu$ is the carrier mobility, l is the carrier mean free path. In determining the field dependence of MR, the solution of the Boltzmann equation readily gives a $H^2$ dependence for sufficiently small field. As H is increased, deviation from the $H^2$ dependence occurs at a certain field value $H_D$, defined as the deviation field, with which one can gauge the carrier mobility or mean free path in various samples.

We have determined the value of $H_D$ at different temperatures for various nanowires. In the 400 nm wires, $H_D$ is 11 kOe at 300 K, decreases to 9 kOe at 200 K, and 5 kOe at 40 K. The reduction of $H_D$ at lower temperature corresponds naturally to an increasing carrier mean free path and mobility. Since $H_D$ only decreases by a factor of 2.2 from 300 K to 40 K, the carrier mobility increases by the same factor. This is consistent with the suppression of the temperature dependence of the mobility discussed earlier. At the same temperature, narrower wires show a larger $H_D$, or smaller mean free path and mobility. For example, at 300 K, $H_D$ is 20 kOe in 200 nm wires, 11 kOe in 400 nm wires, 7.3 kOe in 1 $\mu$m wires, and 6 kOe in 2 $\mu$m wires. In comparison, in bulk Bi single crystals, deviation from the quadratic field dependence occurs at a very small field of 4 Oe at 4.2 K, relating to a long mean free path of a few millimeters. In our Bi nanowires, $H_D$ is several thousand Oe, even at very low temperatures. The large values of $H_D$ indicate a reduction of mean free path by over three orders of magnitude, to less than 1 $\mu$m, on the same scale as that of the nanowire diameter. As a crude estimate, relating a mean free path of 1 mm to a deviation field of 4 Oe as in bulk Bi, one obtains a reduced mean free path of 200 nm for the 200 nm wires, 360 nm for the 400 nm wires, 550 nm for the 1 $\mu$m wires, and 670 nm for the 2 $\mu$m wires.

While the invention has been described in detail in connection with the best mode of the invention currently known, it should be readily understood that the invention is not limited to the specified embodiments described herein. Rather, the invention can be modified to incorporate any number of variations, alterations, substitutions or equivalent arrangements not heretofore described, which are commensurate with the spirit and scope of the invention. Accordingly, the invention is not limited by the foregoing description, but is only limited by the scope of the appended claims.

What is claimed is:

1. A method of fabricating semi-metallic bismuth nanowires, the method comprising the steps of:
    supplying an insulating membrane as a template for the bismuth nanowires;
    coating a first layer of metal onto a first side of the membrane as an electrode;
    confining a semi-metallic bismuth-based electrolyte to a second side of the coated membrane;
    buffering the deposition solution; and
    applying a voltage potential to the deposition solution.

2. The method of fabricating semi-metallic bismuth nanowires as recited in claim 1, wherein said coating step further comprises coating a first layer of metal alloy onto a first side of the membrane as an electrode.

3. The method of fabricating semi-metallic bismuth nanowires as recited in claim 1, wherein said coating step further comprises coating a first layer of metal that is chemically stable in the deposition solution onto a first side of the membrane as an electrode.

4. The method of fabricating semi-metallic bismuth nanowires as recited in claim 1, wherein said confining step further comprises the substep of:
    forming the semi-metallic bismuth-based electrolyte from approximately 75 g/l bismuth nitrate pentahydrate; approximately 65 g/l potassium hydroxide; approximately 125 g/l glycerol; and approximately 50 g/l tartaric acid.

5. The method of fabricating semi-metallic bismuth nanowires as recited in claim 1, wherein said buffering step further comprises the step of buffering the deposition solution to a pH level of approximately 0.9 using nitric acid.

6. The method of fabricating semi-metallic bismuth nanowires as recited in claim 1, wherein said supplying an insulating membrane step further comprises the step of supplying an insulating pourous mica membrane.

7. The method of fabricating semi-metallic bismuth nanowires as recited in claim 1, wherein said supplying an insulating membrane step further comprises the step of supplying an insulating membrane of alumite.

8. The method of fabricating semi-metallic bismuth nanowires as recited in claim 1, wherein said applying a voltage potential to the deposition solution step is achieved through the use of a three-electrode electrochemical cell.

9. The method of fabricating semi-metallic bismuth nanowires as recited in claim 8, wherein the voltage potential is approximately −30 mV relative to the Ag+/AgCl reference electrode.

* * * * *